United States Patent Office 2,903,442
Patented Sept. 8, 1959

2,903,442

TRIAZINE MONOAZO-DYESTUFFS

Henri Riat, Arlesheim, Switzerland, assignor to Ciba Limited, Basel, Switzerland, a Swiss firm No Drawing. Application September 3, 1957
Serial No. 681,455

Claims priority, application Switzerland
September 6, 1956

9 Claims. (Cl. 260—153)

This invention provides azo-dyestuffs, which like, for example, the monoazo-dyestuff of the formula (1)
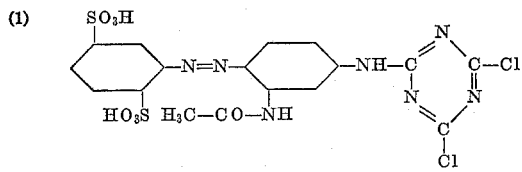

correspond to the general formula (2)    $R_1$—N=N—$R_2$—X—$R_3$ in which $R_1$ represents an aromatic, advantageously bicyclic, radical of a diazo-component which contains at least as many sulfonic acid groups as 6-membered aromatic rings and which may contain an azo linkage, $R_2$ represents a benzene radical which is bound in the 4-position to X and in the 1-position to the azo linkage, and which contains in the 2-position an acylamino group, X represents a bridge member bound through a nitrogen atom to $R_2$, and $R_3$ represents the radical of a dihalogen-triazine.

The new dyestuffs of the Formula 2 are made by condensing an amino-azo-dyestuff of the formula (3)    $R_1$—N=N—$R_2$—Y in which $R_1$ and $R_2$ have the meanings given above, and Y represents an acylatable amino group, with a trihalogen-triazine, especially cyanuric chloride (2:4:6-trichloro-1:3:5-triazine) in such manner that a primary condensation product is obtained which contains two exchangeable halogen atoms in the triazine nucleus.

The amino-azo-dyestuffs of the Formula 3 can be made by coupling a 1-amino-3-acylaminobenzene with a diazotized aromatic amino-sulfonic acid which contains at least as many sulfonic acid groups as 6-membered aromatic rings.

Accordingly, in order to prepare an amino-azo-dyestuff of the Formula 3 there is used a diazo-component, for example, of the benzene or naphthalene series, which may contain an azo linkage and which contains at least one sulfonic acid group per 6-membered aromatic ring and may contain further substitutents, for example, a halogen atom such as chlorine, or a methoxy or ethoxy group. By virtue of the ease with which they can be obtained and the good results obtained therewith there are used more especially mono- or di-sulfonic acids of aminobenzene for example, 1-aminobenzene-2-, -3- or -4-sulfonic acid, 3-amino-2-hydroxybenzoic acid-5-sulfonic acid, 5-amino-2-hydroxybenzoic acid-3-sulfonic acid, 2-aminobenzoic acid-4- or -5-sulfonic acid or 1-aminobenzene-2:5-disulfonic acid, disulfonic acids of amino-azobenzene, for example, 4-amino-1:1'-azobenzene-3:4'-disulfonic acid, and also disulfonic acids of the formula

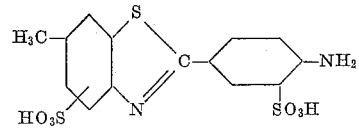

obtained by thermal rearrangement of the acid sulfate of the monosulfonic acid obtained by sulfonating 2-(4'-aminophenyl)-6-methyl-benzimidazole with concentrated sulfuric acid, and especially α- or β-naphthylamine disulfonic acids such as 1-aminonaphthalene-3:6-disulfonic acid or 2-aminonaphthalene-3:6-, -5:7-, -4:8- or -6:8-disulfonic acid.

There are used for coupling with the aforesaid diazo-component containing sulfonic acid groups 1-amino-3-acylaminobenzenes. The latter may contain, especially in the 6-position, further substituents, for example, a lower alkyl or alkoxy group such as a methyl, ethyl, methoxy or ethoxy group. The acyl amino group in the 3-position may be derived from an alkane sulfonic acid or advantageously from a carboxylic acid, and especially an aliphatic carboxylic acid of low molecular weight. As such acylamino groups there may be mentioned, for example, the formylamino, acetylamino, propionylamino, hydroxyacetylamino, hydroxypropionylamino or $H_2N$—CO— group. Thus, for example, there are advantageously used 1-amino-3-acylaminobenzenes of the formula (4)
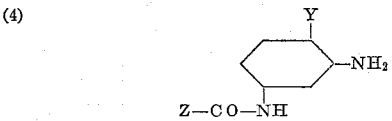

in which Y represents a hydrogen atom or a lower alkyl or lower alkoxy group, and Z represents the methyl, ethyl or hydroxymethyl group, or a lower alkoxy group or a free amino group. As examples of 1-amino-3-acylaminobenzenes of the Formula 4 there may be mentioned:

1-amino-3-acetylaminobenzene,
1-amino-3-N-acetyl-N-methyl- or -ethylaminobenzene,
1-amino-3-propionylaminobenzene,
1-amino-3-hydroxyacetylaminobenzene,
1-amino-3-acetylamino-6-methoxybenzene,
1-amino-3-acetylamino-6-methylbenzene,
(3-aminophenyl)-urea,
1-amino-3-carbomethoxyaminobenzene,
1-amino-3-carbethoxyaminobenzene,
1-amino-3-methane-sulfonylaminobenzene.

These 1-amino-3-acetylaminobenzenes may be coupled with the aforesaid diazo-components containing sulfonic acid groups by methods in themselves known, advantageously in a weakly acid to neutral, for example, acetic acid, medium.

The condensation of the dyestuffs of the Formula 2 with the trihalogen-triazines, such as cyanuric chloride, is advantageously carried out in the process of this invention in the presence of an acid-binding agent such as sodium acetate or sodium carbonate, and the condensation is conducted in such manner that the condensation product obtained contains two of the three exchangeable halogen atoms of the trihalogen-triazine used, for example, by reacting 1 molecular proportion of an amino-azo-dyestuff of the Formula 2 with at least one molecular proportion of cyanuric chloride in a weakly acid, neutral to weakly alkaline medium and/or at a sufficiently low temperature.

Notwithstanding that they contain labile halogen atoms the dyestuffs obtained by the process of this invention can be isolated from the medium in which they are formed, for example, by salting out and filtration, and worked up into useful dry dyestuff preparations. The isolation is advantageously carried out at as low a temperature as possible by salting out and filtration. The dyestuff filtered off may be dried, if desired after the addition of a neutral or very weakly alkaline extender. The drying is advantageously carried out at not too high a temperature and, if desired, under reduced pressure. In certain cases dry preparations can be obtained by spray drying the mixture in which the dyestuff has been formed, that is to say, without first isolating the dyestuff.

By the process of this invention there are obtained valuable new azo-dyestuffs which correspond to the Formula 2 and preferably contain at least two groups imparting solubility in water.

The new dyestuffs are suitable for dyeing or printing a very wide variety of materials, especially cellulose-containing materials of fibrous structure such as linen, regenerated cellulose and above all cotton and also synthetic artificial fibers of viscose. They are especially suitable for dyeing by the process in which the dyestuff is applied at room temperature or at a moderately raised temperature to the material to be dyed by the direct dyeing method or by a printing or so-called pad dyeing process from an aqueous bath which contains a high salt-concentration and may be alkaline, and the dyestuff is fixed on the fiber by means of an acid-binding agent with the aid of heat.

When the dyestuffs of this invention contain groups capable of forming metal complexes, for example, ortho-hydroxy-carboxy-groupings, such as are present in salicylic acid esters, the dyeings produced therewith may be treated with an agent yielding metal, for example, an agent yielding chromium and advantageously an agent yielding copper. The treatment with the agent yielding metal may be carried out by methods in themselves known. In many cases very valuable dyeings are obtained by working according to the process in which a dyeing produced with the metal-free dyestuff is after-treated with an aqueous solution which contains a water-soluble, and advantageously complex, copper compound and a basic condensation product of formaldehyde with a compound containing at least once the atomic grouping

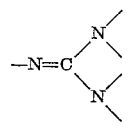

or a compound, such as cyanamide, which is easily convertible into a compound containing the aforesaid atomic grouping.

The dyeings produced on cellulose-containing fibers with the new dyestuffs are usually distinguished by the purity of their tints and by their good fastness to light and especially by their excellent fastness to washing.

The following examples illustrate the invention, the parts and percentages being by weight:

Example 1

30.3 parts of 2-aminonaphthalene-4:8-disulfonic acid are diazotized in the usual manner with 6.9 parts of sodium nitrite in the presence of hydrochloric acid, and the diazo-compound is coupled with an aqueous solution containing 15 parts of 1-amino-3-acetylaminobenzene. There are then slowly added 40 parts of sodium acetate and the whole is stirred for four hours at 5–10° C. The amino-monoazo-dyestuff formed is salted out, filtered off, and dissolved in about 3000 parts of water and the solution so obtained is neutralized. The solution is run into an aqueous ice-cold suspension of 18.5 parts of cyanuric chloride and stirred for one hour at 0–5° C. 50 parts of a 2N-aqueous solution of sodium carbonate are then added dropwise in such manner that the reaction solution has a weakly acid reaction (a pH value of 5.5 to 6.5). When free amino groups can no longer be detected, the pH value is adjusted to 7.5 to 8 by adding a small amount of sodium carbonate. The dyestuff is then salted out, filtered off, and dried at 40° C. It dissolves in water with a yellow coloration and dyes cotton from an alkaline bath in the presence of an electrolyte pure reddish yellow tints. The dyeings are remarkably fast to light and washing.

Similar dyestuffs are obtained by the method described above by using, instead of the aforesaid 2-aminonaphthalene-4:8-disulfonic acid, the compounds given in column I of the following table and the coupling components given in column II, the tints of the dyeings produced with the dyestuffs being given in column III:

|   | I | II | III |
|---|---|---|---|
| 1 | 2-aminonaphthalene-4:8-disulfonic acid. | 3-aminophenyl-urea. | reddish yellow. |
| 2 | ___do___ | 1-amino-3-(hydroxyacetylamino)-benzene. | Do. |
| 3 | ___do___ | 1-amino-3-propionylaminobenzene. | Do. |
| 4 | ___do___ | 1-amino-3-acetylamino-6-methoxybenzene. | yellowish orange. |
| 5 | 1-aminonaphthalene-3:6-disulfonic acid. | 1-amino-3-acetylaminobenzene. | reddish yellow. |
| 6 | ___do___ | 1-amino-3-acetylamino-6-methylbenzene. | Do. |
| 7 | 1-aminobenzene-2:5-disulfonic acid. | 1-amino-3-acetylaminobenzene. | yellow. |
| 8 | 1-aminobenzene-3-sulfonic acid. | ___do___ | Do. |
| 9 | 2-aminonaphthalene-5:7-disulfonic acid. | 1-amino-3-acetylaminobenzene. | reddish yellow. |
| 10 | 2-(4'-aminophenyl)-6-methylbenzthiazole disulfonic acid. | ___do___ | yellow orange. |
| 11 | 4-amino-1:1'-azobenzene-3:4'-disulfonic acid. | 1-amino-3-acetylaminobenzene. | yellowish orange. |
| 12 | 2-aminonaphthalene-4:8-disulfonic acid. | 1-amino-3-methanesulfonylamino-benzene. | reddish yellow. |

Example 2

2 parts of the dyestuff obtained as described in the first paragraph of Example 1 are dissolved in 2000 parts of cold water. 100 parts of well wetted cotton yarn are entered into the resulting dyebath at 20–30° C., 500 parts of sodium chloride solution of 20% strength are added in portions in the course of 30 minutes, and after a further 10 minutes 100 parts of a sodium carbonate solution of 10% strength are added. Dyeing is continued for 60 minutes at 25–35° C. A reddish yellow dyeing is obtained, which is then rinsed in cold water, soaped at 80–100° C., thoroughly rinsed with cold water and dried. The reddish yellow dyeing is very fast to washing.

What is claimed is:

1. A water-soluble monoazo dyestuff of the formula

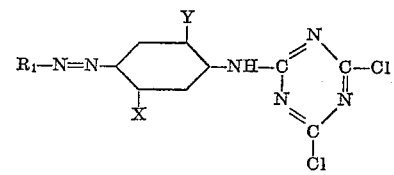

wherein $R_1$ represents an at most bicyclic aromatic radical containing at least as many sulfonic acid groups as aromatic 6-membered nuclei, said radical being selected from the group consisting of benzene monosulfonic acid, benzene disulfonic acid, α-naphthyl disulfonic acid, and β-naphthyl disulfonic acid radicals, X represents lower acylamino with at most 3 carbon atoms, which is bound to the benzene nucleus by its nitrogen atom, and Y represents a member selected from the group consisting of hydrogen, lower alkyl and lower alkoxy.

2. A water-soluble monoazo dyestuff of the formula

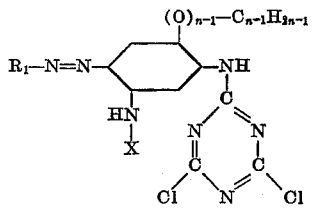

wherein $n$ represents a whole number up to 2, X represents lower acyl with at most 3 carbon atoms and $R_1$ represents sulfophenyl.

3. A water-soluble monoazo dyestuff of the formula

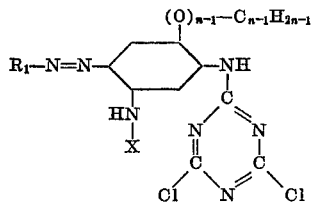

wherein $n$ represents a whole number up to 2, X represents lower acyl with at most 3 carbon atoms, which is bound to the NH group by its —CO— group and $R_1$ represents disulfonaphthyl.

4. A monoazo dyestuff of the formula

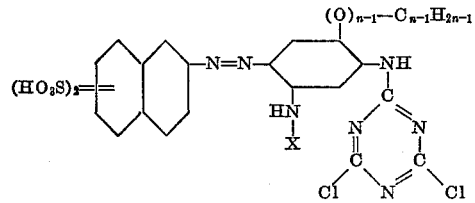

wherein $n$ represents a whole number up to 2, and X represents a lower acyl group of at most 3 carbon atoms.

5. The monoazo dyestuff which in its free acid state corresponds to the formula

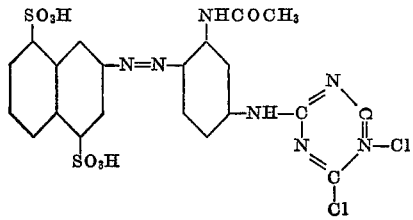

6. The monoazo dyestuff which in its free acid state corresponds to the formula

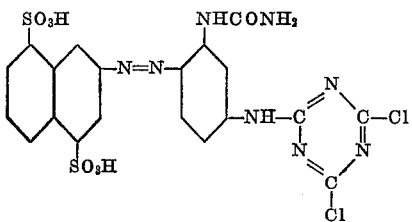

7. The monoazo dyestuff which in its free acid state corresponds to the formula

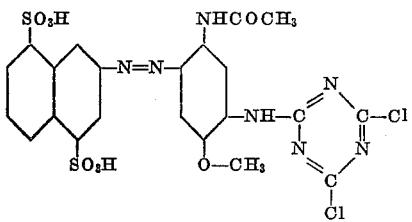

8. The monoazo dyestuff which in its free acid state corresponds to the formula

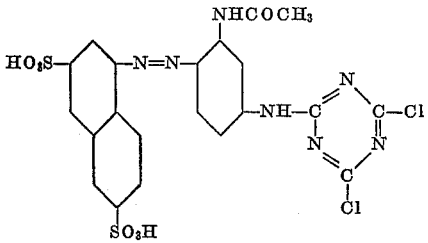

9. The monoazo dyestuff which in its free acid state corresponds to the formula

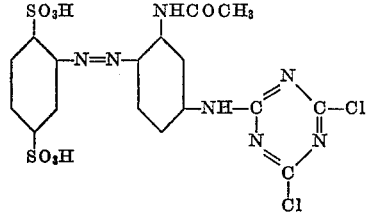

References Cited in the file of this patent
FOREIGN PATENTS
760,347    Great Britain _____ Oct. 31, 1956

UNITED STATES PATENT OFFICE
CERTIFICATE OF CORRECTION

Patent No. 2,903,442　　　　　　　　　　　　　　September 8, 1959

Henri Riat

It is hereby certified that error appears in the printed specification of the above numbered patent requiring correction and that the said Letters Patent should read as corrected below.

Column 5, lines 45 to 50, claim 5, the lower right-hand portion of the formula should appear as shown below instead of as in the patent:

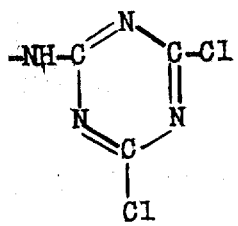

Signed and sealed this 17th day of May 1960.

(SEAL)
Attest:

KARL H. AXLINE
Attesting Officer

ROBERT C. WATSON
Commissioner of Patents